Figure 1:
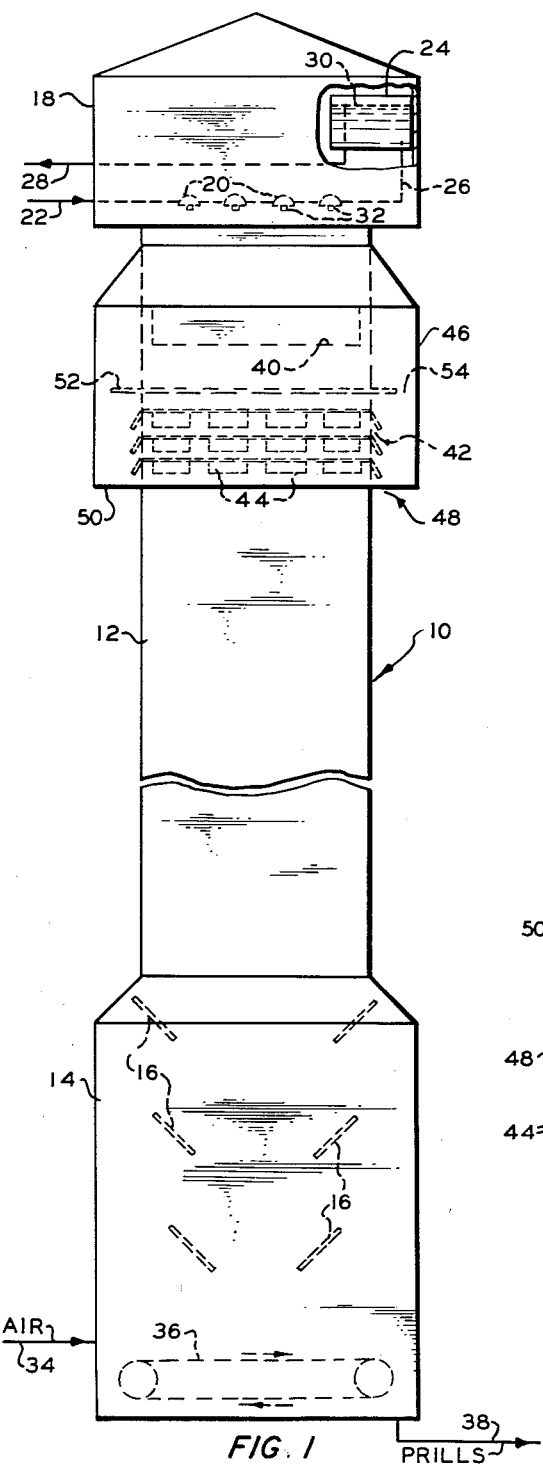

May 23, 1961          C. V. MULLEN, JR          2,984,863
PRILLING TOWER
Filed Feb. 2, 1959

INVENTOR.
C.V. MULLEN, JR.

BY *Hudson & Young*

ATTORNEYS

… …

United States Patent Office 2,984,863
Patented May 23, 1961

2,984,863

PRILLING TOWER

Charles V. Mullen, Jr., Dumas, Tex., assignor to Phillips Petroleum Company, a corporation of Delaware Filed Feb. 2, 1959, Ser. No. 790,714

7 Claims. (Cl. 18—2.4)

This invention relates to a prilling tower for use in prilling molten solids.

The prilling of molten solids to provide small granules or prills of the solid material when cooled to atmospheric temperatures is a conventional practice well known in the art. Ammonium nitrate is a good illustration of a commercial product which is sold in prill form and is prilled by introducing a concentrated molten solution of the material into the top of a tower by spraying the solution thru small orifices to form droplets and permitting the droplets to gravitate thru a tower countercurrently to an upwardly directed current of cool air. During the fall the droplets become substantially spherical and solidify in this form before reaching the bottom of the tower from which the resulting prills or granules are removed in desired manner.

Air for cooling the molten droplets is introduced into the bottom of the tower by one or more blowers and the ascending air is vented thru the walls of the tower just below the level at which the droplets are formed. A common form of tower comprises upright sheet metal walls having vents in their upper sections for exhausting the ascending air from the tower before it strikes the prilling headers. One form of tower utilized in prilling ammonium nitrate is of rectangular cross section 20 feet by 30 feet in dimension and 195 feet high. In windy weather air is forced into the tower thru the vents on the windward side of the tower thereby creating drafts and undesirable turbulence in the section of the tower immediately below the prilling headers and in the area of the tower in which the droplets are still in fluid or plastic condition. The turbulence thus effected has been found to cause the distortion of the solidifying droplets so as to form imperfect and irregular prills thereby producing in inferior product. This invention is concerned with a tower structure which eliminates the formation of imperfect prills caused from undue turbulence in the prill-solidifying section of the prilling tower in windy weather.

It is therefore an object of the invention to provide an improved prilling tower for prilling molten solids. Another object is to provide a prilling tower of a construction which avoids backdrafts in the tower thru the exhaust vents thereof. A further object is to provide a tower construction which effects regular and uniform flow of cooling gas thru the exhaust vents. Other objects of the invention will become apparent upon consideration of the accompanying disclosure.

In accordance with a broad aspect of the invention, a housing is provided around the exhaust vents in a prilling tower and the housing is provided with an air outlet positioned so as to prevent the direct blowing of outside air thru the housing outlet into the exhaust vents of the tower wall. One embodiment of the invention comprises flaps outwardly hinged over the tower vents which tend to close when a current or draft of outside air attempts to pass thru the exhaust vents.

Figure 2:
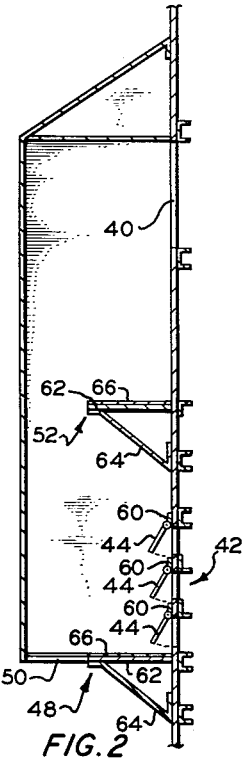
Figure 3:
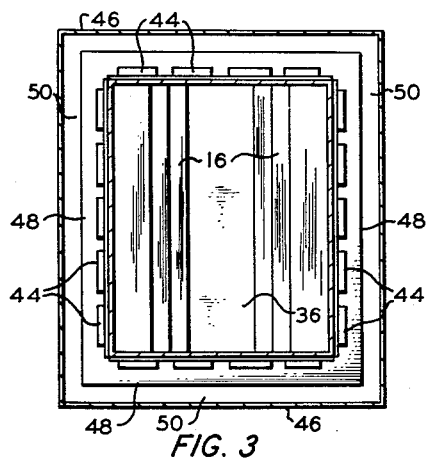

A more complete understanding of the invention may be had from consideration of the accompanying schematic drawing of which Figure 1 is a side elevation of a tower with a portion of the control room removed; Figure 2 is a partial cross section thru the vent area of the tower wall; and Figure 3 is a cross section of the tower taken on the line 3—3 of Figure 1.

Referring to Figure 1, tower 10 comprises a main shaft or prilling chamber 12, an expanded bottom section 14 containing deflectors 16, and a control room 18 on top of the prilling chamber. Control room 18 contains, in addition to various control equipment not shown, prilling headers 20, supplied by line 22 and connected with constant head tank 24 by means of relief conduit 26. Recycle line 28 extends into tank 24 to a fixed predetermined level 30 and connects with a source of hot melt and pumping means not shown. Supply line 22 also connects with the source of hot melt and pumping means. Prilling headers 20 are provided with small nozzles or orifices 32 on their bottom sides.

Tower section 14 is provided with an air inlet duct 34 and prill collecting conveyor 36 which delivers prills to line 38. The upper section of the tower just below the control room and the prilling headers 20 is provided with upper vents 40 and lower vents 42 for venting air ascending the tower. Lower vents 42 are provided with covering flaps 44 which are outwardly hinged and free to rotate about the hinge outwardly from the tower wall. The vented section of the tower is enclosed by a housing 46 extending around the tower on all four sides along with vents 40 and 42. A floor 48 in housing 46 extends outwardly from the tower wall at the lower edge of vent 42 and encircles the tower. This floor leaves an exhaust space 50 all around the wall of the housing for exhausting of air passing thru vents 40 and 42. A second floor or catwalk 52 extends around the tower below vent 40 and also leaves an open space 54 between the edge of the floor and the wall of the housing for egress of air passing thru vent 40.

Figure 2 shows in more detail the novel tower structure. Vent 42 is provided with covering flaps 44 which are hinged at their upper edges by means of suitable hinges 60. Flaps 44 may be made of any suitable material which is sufficiently light in weight to be sensitive to small differences in air pressure. Aluminum or other light metal sheet is suitable material for the flaps. These flaps may also be made of thin light weight plywood, polyethylene, or other plastic, fiberboard (such as Masonite), pressed ground corn stalks, etc. Floors 48 and 52 comprise stringers 62 extending outwardly from the tower wall at regular intervals and supported by braces 64. Sheet metal, plywood, plastic, or other type imperforate flooring 66 is placed across the stringers and fixed thereto by suitable means.

Figure 3 shows the rectangular cross section of the tower and housing 46 completely surrounding the tower, as well as flaps 44 made in short sections of 5 to 10 feet extending completely around the tower.

In operation the molten material to be prilled is fed thru supply line 22 to prilling headers or sprays 20 which are connected so that material not passing thru the spray nozzles 32 passes on thru the relief conduit 26 to constant head tank 24. A constant pressure is maintained in the spray conduits so as to effect uniform droplet formation in accordance with the method disclosed and claimed in my copending application, S.N. 790,626, filed, February 2, 1959. The droplets of molten material gravitate thru a quiescent zone between the upper level of vent 40 and prilling nozzles where they become stabilized spheres before they pass into the upwardly rising cool air in the tower. In gravitating thru the tower, the droplets solidify and become sufficiently hard to avoid deformation before they reach the bottom of the tower where they strike deflector vanes 16 and are delivered to recovery belt 36 for transfer to line 38. Air for the cooling process is introduced to the bottom of the tower thru duct 34 driven by a blow not shown. The ascending air not only cools the prills but also slows their descent. The air is vented thru vents 40 and 42 into housing 46 from which it passes thru exhaust outlet 50.

The positioning of floor 48 at the lower edge of vent 42 and extending the floor a substantial distance out from the tower wall greatly reduces the tendency of air on the windy side of the tower to pass thru vent 42. Floor 52 likewise has a protecting influence on vent 40. Because of this protecting influence and the remoteness of vent 40 from exhaust outlet 50 at the bottom of the housing, it is unnecessary to place flaps over vent 40. In most weather, flaps 44 are not necessary to prevent back drafts thru vent 42; however, on extremely windy days such as occur in the Panhandle area of Texas where it is not unusual for the wind to reach velocities in the range of 40 to 60 miles per hour, flaps 44 are necessary in order to prevent backdrafts thru vent 42 which materially interfere with good prilling operation.

A prilling tower of the character described may be of rectangular, circular, or regular polygonal cross section. Such towers usually have a cross sectional area in the range of about 300 to 1200 square feet. The upper level of the highest vents in the tower should be at least a foot below the prilling orifices and may be anywhere in the range of 1 to several feet below same. The protecting floor at the lower row of vents should extend out a distance in the range of two to several feet in order to provide the desired protection for the lower row of vents. The exhaust space or outlet in the bottom of the vent housing should be at least one foot in width and up to 4 or 5 feet depending upon the cross section of the tower and the amount of pressure differential to be maintained between the exhaust outlet and the inside of the tower.

A tower of rectangular cross section 20' x 30' and 195 feet high was constructed in accordance with the invention in the Texas Panhandle area, where adverse weather conditions may prevail at any season of the year. The tower was provided with a housing approximately 20 feet high and 7 feet wide around its vent section. The top of the housing roof commenced at a level 1 foot below the floor of control room or the approximate location of the prilling nozzles. The floor of the housing extended out 5 feet, thereby leaving an exhaust outlet 2 feet wide encircling the tower at the outer wall of the housing. The vent adjacent the floor was 4 feet in height and was covered by three flaps uniformly spaced at 16 inch intervals, the flaps being 16 inches wide. The upper vent was also 4 feet in height and was positioned intermediate the roof of the housing and a catwalk 10 feet above the floor of the housing and extending out the same distance, viz., 5 feet. The flaps were hinged at their upper edges as shown in the drawing and were made of Marlex (trademark of Phillips Petroleum Company for polyethylene). This tower without the housing structure and without flaps was operated in the prilling of ammonium nitrate and it was found that during windy weather the wind entered the windward side of the tower and caused the formation of poorly shaped prills by setting up turbulent air conditions in the upper section of the tower where the prills are in plastic condition. After installation of the flaps and housing the prilling operation was conducted for an extended period of several months without encountering this difficulty even though the wind blew as severely during this period as during the period in which difficulty was encountered without the housing and flaps.

Certain modifications of the invention will become apparent to those skilled in the art and the illustrative details disclosed are not to be construed as imposing unnecessary limitations on the invention.

I claim:

1. A prilling tower comprising in combination an upright elongated walled chamber having droplet forming and dispersing means in an upper section and prill collecting means and cooling gas injecting means in a lower section thereof; exhaust vents in the walls of said tower encircling an upper section of same below first said means; a housing encircling said section including said vents, said housing forming a chamber with said tower closed on the top and lateral sides; a floor in said housing just below said vents encircling said tower and extending outwardly from the tower wall only a substantial portion of the distance to the outer wall of said housing so as to leave an open space between the outer edge of said floor and the outer wall of said housing for venting of gas escaping into said housing from said tower, said floor providing a baffle to prevent outside air from blowing directly thru the bottom of said housing and thru said vents into said tower.

2. The tower of claim 1 including an upper second row of vents encircling said tower.

3. The tower of claim 2 including flaps on the lower row of vents hinged on their upper edges and outwardly extending.

4. The tower of claim 1 including outwardly hinged flaps suspended from their upper edges over said vents and adapted to protect same from inwardly blowing air currents.

5. A prilling tower comprising in combination an upright elongated walled chamber of rectangular cross section of an area in the range of about 300 to 1200 ft.$^2$; spray conduits having droplet forming orifices therein disposed in the top section of said chamber; a constant head tank for molten material being prilled; a relief conduit connecting said spray conduits with said tank; an overflow line from said tank; a supply line for said molten material connected to the inlet side of said spray conduits; prill collecting means and gas injecting means in the bottom section of said chamber; a series of upper and lower exhaust vents in the walls of said chamber extending around said tower below said conduits a distance in the range of one to several feet, said vents having a cross sectional area at least that of said tower; and a housing encircling and enclosing the vented section of said chamber, said housing comprising a horizontal floor encircling the walls of said chamber just below the lower edge of the lower vents and extending out from said walls a distance in the range of two to several feet, an upright wall spaced from said chamber a distance at least one foot greater than the width of said floor so as to leave an open space of an area less than the area of said tower for egress of gas from said housing, and a roof over the enclosed space between said upright wall and the wall of said tower.

6. The tower of claim 5 including rows of flaps on the lower row of vents adapted to prevent back draft thru said vents.

7. The tower of claim 5 including a second floor extending out from the tower wall intermediate the upper and lower exhaust vents only part way across said housing.

References Cited in the file of this patent
UNITED STATES PATENTS

| | | |
|---|---|---|
| 251,092 | Bragg | Dec. 20, 1881 |
| 1,064,951 | Wofford | June 17, 1913 |
| 1,672,291 | Williams | June 5, 1928 |
| 2,528,407 | Yeandle | Oct. 31, 1950 |
| 2,714,224 | Schaub | Aug. 2, 1955 |